Patented Aug. 2, 1938

2,125,314

UNITED STATES PATENT OFFICE 2,125,314

WAX TREATMENT

Oscar L. Roberts, Merwood Park, Pa., assignor to The Atlantic Refining Company, Philadelphia, Pa., a corporation of Pennsylvania No Drawing. Application October 27, 1934, Serial No. 750,353

9 Claims. (Cl. 196—20)

The present invention relates to a method for separating oil-wax mixtures into oil and wax fractions and relates more particularly to the washing or extraction of wax cakes with a solvent liquid to remove miscible constituents therefrom.

My invention is particularly applicable to the removal of liquid constituents from press cakes, for example, the removal of oil from wax cakes produced in the filtration of hydrocarbon oil-wax mixtures.

In the separation of paraffin wax from hydrocarbon oils, such as petroleum lubricating oils, it is common practice to filter the oil-wax mixture under pressure, with or without dilution with a low viscocity solvent. The wax cake obtained by such filtration process usually contains considerable quantities of oil, i. e., on the order of 50% or more by weight of the cake. In some instances the cake may be washed with a solvent liquid, preferably a liquid completely miscible with the oil at the temperature of washing, whereby the oil content of the cake may be reduced. However, in general, the washing of the press cake is not complete, the oil content of the cake being of the order of 25% by weight.

The practice of washing wax cakes is confined primarily to filters of the suction leaf type in which the cakes are built up on the outer surface of the press leaves. In accordance with the conventional method of washing wax cakes in this type of filter, the unfiltered wax slurry is forced from the press casing by gas pressure after a cake of the proper size has been deposited on the filter leaves, and sufficient gas pressure is maintained on the cake to prevent the same from breaking loose and dropping from the leaves. In many instances, sufficient gas pressure is applied to the press cake to force a portion of the oil contained therein completely through and out of said cake. When the unfiltered slurry has been removed from the press casing, wash solvent is passed into the casing, thereby displacing the gas and completely submerging the wax cake. The wash solvent is then forced through the cake, under substantial pressure, and a portion of the oil contained therein is thus removed.

When operating in accordance with the prior practice, the results obtained are, in general, unsatisfactory, inasmuch as the oil content of the washed cake is usually upwards of 25% by weight. The high oil content of the press cake may be attributed to the incomplete washing of the cake, which is usually non-uniform in structure. This non-uniformity generally results from the uneven size and distribution of the wax crystals upon the press leaves and is further aggravated by the employment of gas pressure to hold the cake in place or to force a portion of the contained oil from the cake. I have found that if the unfiltered slurry is drained from the press casing and the cake is subjected to gas pressure, cranks or channels will develop within the cake, thereby permitting passage of wash solvent through the path of lease resistance, i. e., the channels, upon subsequent washing of the cake with a solvent liquid.

In order to overcome this difficulty I propose to effect washing of the wax cake in such a manner that the formation and/or enlargement of cranks or channels will be reduced to a minimum and the removal of oil from the cake may be accomplished with a minimum quantity of wash solvent. To this end, I employ a wash solvent containing wax, preferably a relatively oil-free wax, in a quantity sufficient to saturate the wash solvent and to form a suspension or dispersion of wax crystals therein. The quantity of wax contained in the wash solvent may be of the order of about 0.10% to about 1.0% by weight of the solvent, but somewhat larger or smaller quantities may be employed, depending upon the character of the solvent and the temperature at which the washing operation is carried on.

Briefly, my method comprises passing a wax slurry, prepared from a wax-containing oil stock, either as such or in dilution in a suitable solvent, into a filter press of the stationary or rotary leaf type, building up a wax cake of desired thickness upon the press leaves, displacing any unfiltered slurry from the press casing, and washing the residual oil from the cake by means of a wash solvent containing dissolved and/or suspended wax, such wash solvent being uncontaminated with the slurry being filtered. The wax employed in conjunction with the wash solvent is preferably of the same character as that comprising the wax cake, and may be prepared from the wax-containing oil undergoing treatment.

When operating in accordance with my method, any cracks or channels which may have been formed in the wax cake during the removal of unfiltered slurry from the press casing or during the step of forcing a portion of the residual oil from the cake by gas pressure, will not be enlarged or extended during the washing step. The presence of dissolved and/or suspended wax crystals in the wash solvent prevents further solution of wax from the body of the cake and simultaneously effects a filling or healing of the cracks or channels which may be present in the cake. In the washing step, the wash solvent will follow the paths of least resistance thru the cake, i. e., the channels, and by supplying a suitable quantity of crystalline wax dispersed in the wash solvent, I am able to fill in the channels and thus render the wax cake considerably more uniform. The uniformity thus attained permits of (1) the substantially complete removal of oil from the wax cake, (2) the maintenance of uniform pressure during the washing step, (3) the formation of dense, uniform wax cakes which are readily dried by gas blowing, and (4) the employment of considerably smaller volumes of wash solvent to effect the desired degree of oil removal.

My method of washing may be applied either in the case of conventional filter pressing operations for separating oil-wax mixtures or in the process for washing wax cakes disclosed in my copending application, Serial No. 745,383, filed Sept. 25, 1934.

My process is not confined to the employment of any particular diluent or wash solvent, but may be applied in any filter pressing operation involving the separation of oil from wax, and particularly when solvents such as propane, butane, ethylene dichloride, acetone-benzol and similar agents are employed.

For brevity, in the appended claims, the term "wash solvent" is to be understood to comprehend a liquid which at the temperature of separation, is miscible with the liquid constituents, but relatively immiscible with the solid constituents of the mixture to be separated.

What I claim is:

1. In a process for separating a mixture containing solid wax and hydrocarbon oil thereby to obtain a substantially oil-free wax, the steps which comprise passing such mixture into a filtering zone, filtering said mixture to produce a wax cake, removing from the filtering zone the unfiltered mixture surrounding said wax cake, and washing residual oil from said cake with a wash solvent containing dispersed, solid wax.

2. In a process for separating a mixture containing solid wax and hydrocarbon oil thereby to obtain a substantially oil-free wax, the steps which comprise passing such mixture into a filtering zone, filtering said mixture to produce a wax cake, removing from the filtering zone the unfiltered mixture surrounding said wax cake, and washing residual oil from said cake with a wash solvent containing substantially oil-free dispersed, solid wax.

3. In a process for separating a mixture containing solid wax and hydrocarbon oil thereby to obtain a substantially oil-free wax, the steps which comprise passing such a mixture into a filtering zone, filtering said mixture to produce a wax cake, removing from the filtering zone the unfiltered mixture surrounding said wax cake, and washing residual oil from said cake with a wash solvent containing about 0.1% to 1.0% by weight of wax, at least a portion of which is in a dispersed, solid state.

4. In a process for separating a mixture containing solid wax and hydrocarbon oil thereby to obtain a substantially oil-free wax, the steps which comprise passing such a mixture into a filtering zone, filtering said mixture to produce a wax cake, removing from the filtering zone the unfiltered mixture surrounding said wax cake, and washing residual oil from said cake with a wash solvent containing about 0.1% to 1.0% by weight of substantially oil-free wax, at least a portion of which is in a dispersed, solid state.

5. In a process for separating a mixture containing solid wax and hydrocarbon oil thereby to obtain a substantially oil-free wax, the step which comprises washing oil from said wax with a wash solvent containing dispersed, solid wax.

6. In a process for separating a mixture containing solid wax and hydrocarbon oil thereby to obtain a substantially oil-free wax, the step which comprises washing oil from said wax with a wash solvent containing about 0.1% to 1.0% by weight of wax, at least a portion of which is in a dispersed, solid state.

7. In a process for separating a mixture containing solid wax and hydrocarbon oil thereby to obtain a substantially oil-free wax, the step which comprises washing oil from said wax with a wash solvent containing substantially oil-free dispersed, solid wax.

8. In a process for separating a mixture containing solid wax and hydrocarbon oil thereby to obtain a substantially oil-free wax, the step which comprises washing oil from said wax with a wash solvent containing about 0.1% to 1.0% by weight of substantially oil-free wax, at least a portion of which is in a dispersed, solid state.

9. In a process for separating a mixture containing solid wax and hydrocarbon oil thereby to obtain a substantially oil-free wax, the step which comprises washing oil from said wax with a wash solvent containing dispersed, solid wax, said wash solvent being substantially uncontaminated with oil.

OSCAR L. ROBERTS.